(12) United States Patent
Tokkonen

(10) Patent No.: US 7,710,390 B2
(45) Date of Patent: May 4, 2010

(54) METHOD AND SOFTWARE APPLICATION FOR TRANSMITTING INFORMATION REMAINING BEHIND AN OBSTACLE LOCATED IN FRONT OF THE DISPLAY TO THE USER OF A DATA PROCESSING DEVICE

(75) Inventor: Timo Tokkonen, Oulu (FI)

(73) Assignee: Nokia Corporation, Espoo (FI)

( * ) Notice: Subject to any disclaimer, the term of this patent is extended or adjusted under 35 U.S.C. 154(b) by 1184 days.

(21) Appl. No.: 10/555,533

(22) PCT Filed: Jun. 5, 2003

(86) PCT No.: PCT/FI03/00446

§ 371 (c)(1),
(2), (4) Date: Nov. 4, 2005

(87) PCT Pub. No.: WO2004/109494

PCT Pub. Date: Dec. 16, 2004

(65) Prior Publication Data

US 2006/0284850 A1      Dec. 21, 2006

(51) Int. Cl.
*G08C 21/00* (2006.01)

(52) U.S. Cl. ............... 345/156; 345/162; 345/169; 345/173; 345/204; 178/18.01; 178/18.1; 341/5

(58) Field of Classification Search ............... 345/156, 345/158, 162, 169, 173, 204; 178/18.01, 178/18.1; 341/5
See application file for complete search history.

(56) References Cited

U.S. PATENT DOCUMENTS

| | | | | |
|---|---|---|---|---|
| 4,485,378 | A | * | 11/1984 | Matsui et al. ............... 345/28 |
| 6,570,103 | B1 | * | 5/2003 | Saka et al. ............... 178/18.01 |
| 2002/0101418 | A1 | | 8/2002 | Vernier et al. ............... 345/418 |
| 2003/0038786 | A1 | * | 2/2003 | Nguyen et al. ............... 345/169 |
| 2005/0145807 | A1 | * | 7/2005 | Lapstun et al. ............... 250/566 |
| 2008/0231549 | A1 | * | 9/2008 | Rolland Du Roscoat ...... 345/33 |

FOREIGN PATENT DOCUMENTS

| | | |
|---|---|---|
| EP | 0 313 494 A2 | 4/1989 |
| EP | 0 767 419 A1 | 4/1997 |
| EP | 1 162 811 A2 | 12/2001 |

* cited by examiner

*Primary Examiner*—Bipin Shalwala
*Assistant Examiner*—Vince E Kovalick
(74) *Attorney, Agent, or Firm*—Harrington & Smith

(57) ABSTRACT

The object of the invention is a method and a software application embodying the method for displaying the information in the display (10) of a data processing device in a situation where a portion of the display (10) area, and thus also a portion of the information on the display, is covered by an obstacle (11) in front of the display (10). The method according to the invention detects the size and position of the obstacle (11), and then regroups (12c) the information in the display (10) into a portion of the display (10), which is not left behind the detected obstacle (11).

14 Claims, 2 Drawing Sheets

METHOD AND SOFTWARE APPLICATION FOR TRANSMITTING INFORMATION REMAINING BEHIND AN OBSTACLE LOCATED IN FRONT OF THE DISPLAY TO THE USER OF A DATA PROCESSING DEVICE

FIELD OF THE INVENTION

The object of the invention is a method for displaying the information in the display of a data processing device in a situation where a portion of the display area, and thus also a portion of the information on the display, is covered by an obstacle in front of the display. The invention also relates to a software application in the data processing device in order to realise the method.

BACKGROUND

In data processing and/or in data transmission different lightweight and mobile devices increase in popularity. Examples of such devices are portable computers, palm computers and cellular network terminals. The display unit connected to these devices is generally realised by a technology, which makes it possible to realise a quite flat display. One example of this is an LCD display (Liquid Crystal Display). The display may also act as portion of the user interface through which instructions are entered to the actual data processing device. Then they are so called touch screens, where either a certain part or the whole display is touch sensitive, or where an obstacle placed in front of the display can be detected at the surface level of the display. Through a touch screen of this kind the device connected to the display can be controlled to perform a previously programmed function.

There are also different known solutions for electronic books or magazines, which are downloaded via a data communication network. The realisation of such solutions requires a display device, which is flexible, lightweight and has a size of at least a book page. The electronics required by the display is integrated as a part of the display. A means of this kind for displaying information may be able to operate only in a particular application, for instance only as a magazine monitor.

Hereafter the electronic devices mentioned above are called by a common term data processing device, no matter whether it is a personal computer with its display or a future electronic magazine monitor presented above.

The data processing devices mentioned above may be used and kept anywhere, as they already originally were designed to be portable and utilised in different places. For instance, if the data processing device is kept on the desk among papers and other objects, objects/obstacles may pile up on it, thus at least partly covering the device or its display. Then it will be more inconvenient to use the data processing device, as the display may be covered so that the user must first remove the disturbing obstacles in front of the display before being able to begin to use the data processing device.

SUMMARY

An example of this situation is shown in FIGS. 1a and 1b. FIG. 1a shows the display 10 of a data processing device in a situation where the information 12a in the form of text can be freely viewed by the user. FIG. 1b shows a situation, where an obstacle 11 covers a portion of the display 10, so that all parts of the text 12b are not visible. The obstacle 11 can be for instance a piece of paper, an object or even the user's finger.

In the case of FIG. 1b the information/text 12b on the display can be interpreted falsely, or it may impossible to understand it as a part of the contents 12b is hidden. If the display 10 is of the touch screen type it is possible in some situations that the object covering the display can cause a false action in the data processing device.

The object of the present invention is to present a method and a software application realising the method, with the aid of which the display of the data processing device utilised by the user contains/displays information only in those portions which the user can view on the display in use.

The objects of the invention are attained so that the touch screen in use is able to detect a situation where a portion of the display is hidden behind an obstacle. When this coverage is detected the data processing device regroups the displayed information, either entirely or a predetermined part of it, into that portion of the display which is not covered by the interfering obstacle.

An advantage of the method according to the invention is that the information in the display of the device utilised by the user is still in a utilizable form, even if a portion of the display would be shadowed by an obstacle.

The method according to the invention for regrouping the information in the display of a data processing device in a situation, where a portion of the display is hidden behind an obstacle in front of the display, is characterised in that in the method the information in the display is regrouped into an uncovered portion of the display, so that at least a part of the information in the display left behind the obstacle is regrouped into the uncovered portion of the display.

The software application according to the invention for regrouping the information in the display of a data processing device in a situation where a portion of the display is covered by an obstacle in front of the display is characterised in that the information in the display is arranged to be regrouped by the software application so that at least a portion of the information contents in the display left behind the obstacle is regrouped into the uncovered portion of the display.

Some advantageous embodiments of the invention are presented in the dependent claims.

The basic idea of the invention is as follows: The display of the data processing device is basically a prior art touch screen. If a portion of the display is hidden behind an obstacle for a longer time, then the information left in this covered portion of the display is advantageously regrouped together with the uncovered information into that portion of the display, which is not covered. Thus the original information can still be viewed in the uncovered portion of the display. When the covering obstacle is removed from its position in front of the display, then the information in the display is again regrouped so that it fills the entire display area. With the aid of the method according to the invention it is thus possible to constantly utilise the display visible to the user, without loosing any original information contents of the display.

BRIEF DESCRIPTION OF THE DRAWINGS

The invention is described in detail below. The description refers to the enclosed figures, in which.

DETAILED DESCRIPTION

Figure 1A:
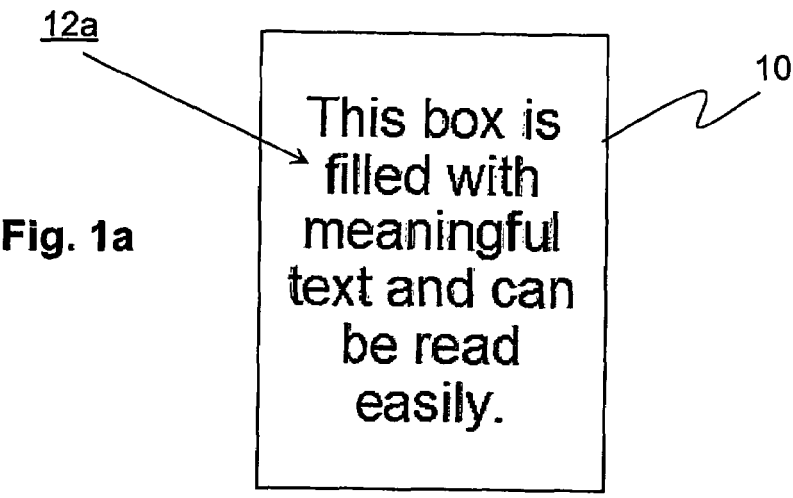
FIG. 1a shows as an example the display of a data processing device and the text in it.
Figure 1B:
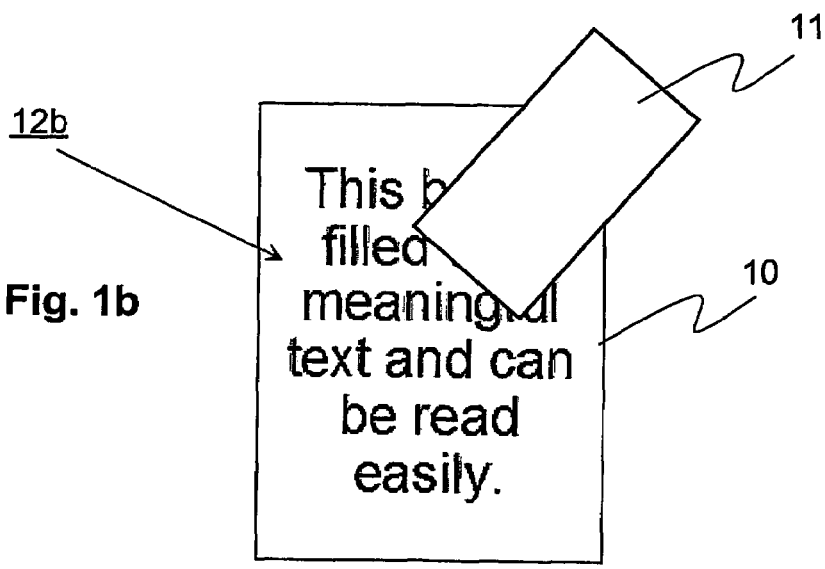
FIG. 1b shows as an example the display of a data processing device and the text in it, which is covered under an obstacle.
Figure 1C:
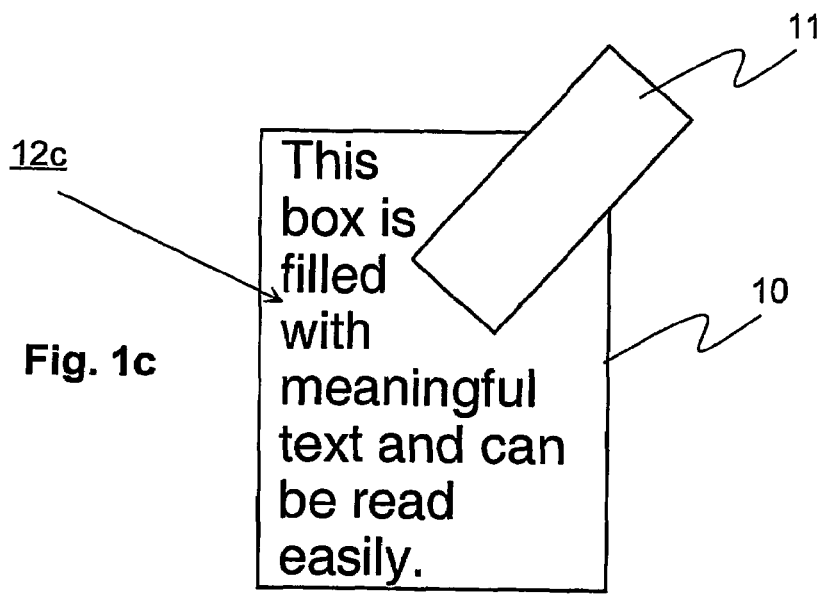
FIG. 1c shows as an example the display of a data processing device and the text in it, when the method according to the invention is applied.

FIGS. 1a and 1b were described above in connection with the description of prior art. FIG. 1c shows how the method according to the invention solves the problem situation shown in FIG. 1b. In the example shown in FIG. 1c the display 10 of the data processing device is a prior art touch screen. When an obstacle 11 covers at least a portion of the display 10, then the touch screen 10 detects which portion of the display 10 is covered by the obstacle. When the coverage is detected, then the software application installed in the in the data processing device regroups/modifies the displayed information into a form 12c, in which no part of the original information 12a defined to be regrouped will be hidden by the obstacle 11. When desired it is also possible to modify the physical size of the displayed information 12c in connection with the regrouping, so that the entire information can be displayed in the available portion of the display. Then the original information contents 12a can be viewed as the regrouped information 12c in the uncovered portion of the display 10.

Advantageously two separate additional factors contribute to the fact whether the information in the display will be regrouped or not. The first additional factor is the physical size of the obstacle 11. Thus for instance the user's finger can be classified as a so small obstacle that it will not cause a regrouping. On the other hand, a piece of paper over the display will cause a regrouping. A characteristic threshold value is advantageously defined for each display type and size, whereby the information in the display is regrouped if this threshold is exceeded.

The coverage time caused by the obstacle 11 can be used as a second additional factor to aid the regrouping. If the obstacle 11 is rapidly removed from its position in front of the display 11 within a certain time window, then advantageously the information will not be regrouped. On the other hand, the information in the display will be regrouped, if the obstacle 11 remains in its place in front of the display 10 during a sufficiently long time. Advantageously the user of the data processing device can define both these additional factors, which provides a system preferred by the user, whereby the operation of the system does not unnecessarily disturb the user with too rapid regrouping of the information, but still always performs the regrouping when required.

In an advantageous embodiment of the invention a certain portion of the display 10 contains regions, where regrouping is not performed. The definition of these regions can be made device by device, or even the user of the device can be authorized to define these stationary regions. It is also possible to define such regions in the display 10, into which it is not allowed to move information from the display area, which stays behind the object 11 or which is covered by the object.

One example of such stationary information or a region intended to be left unchanged is the soft buttons, which can be used to control the data processing device. Thus advantageously these function buttons are not regrouped, even if they were left behind the obstacle 11. All other information, which is presented in the display and which is possibly covered by the obstacle 11, is then regrouped so that it can be viewed by the user. In this approach the function buttons, which are important regarding the operation of the device, can be always kept in the same position of the display 10, when desired/required.

Figure 2:
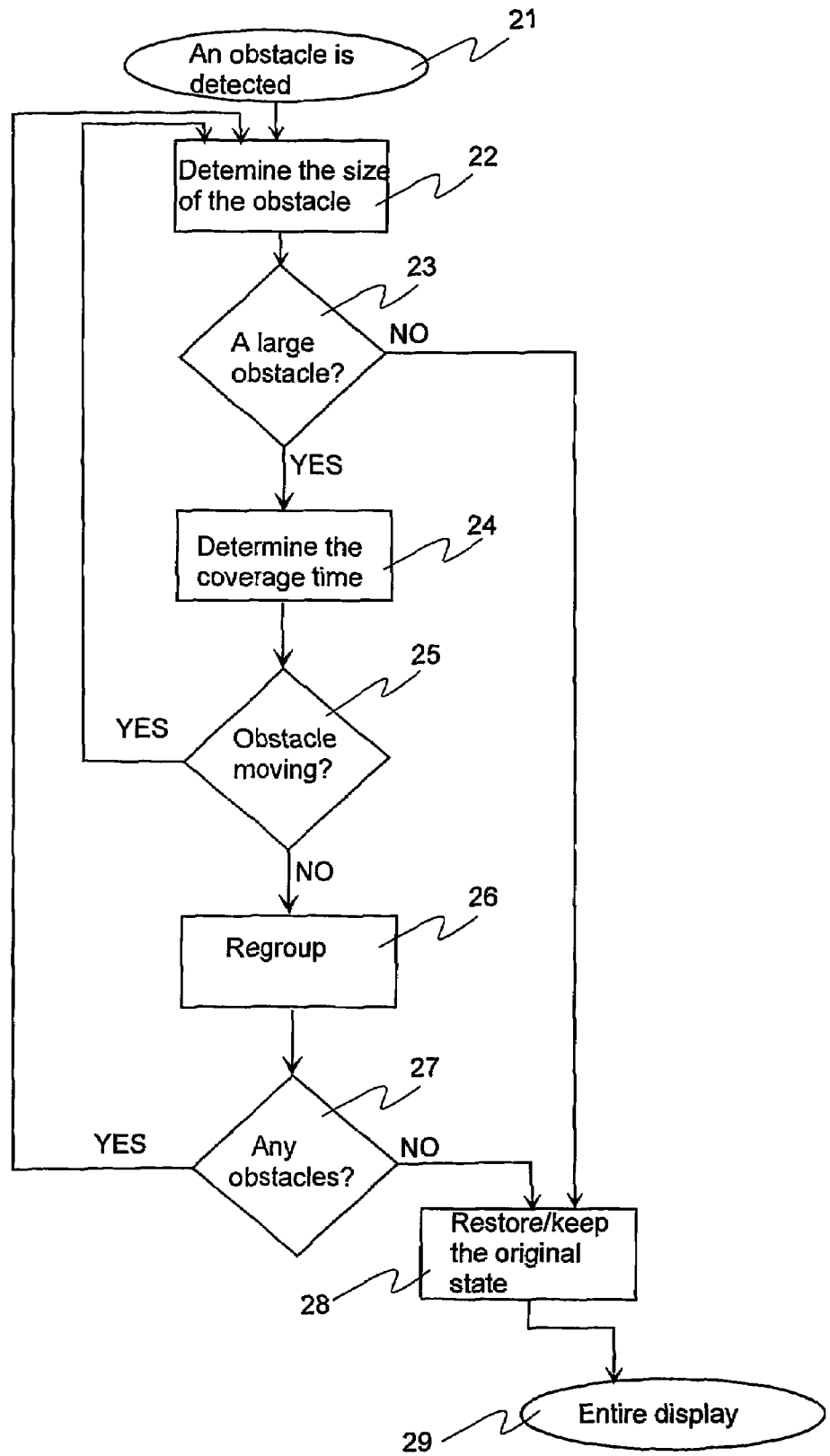
FIG. 2 shows as an example the main steps of the method according to the invention in a flow diagram.

FIG. 2 shows as an example in a flow diagram the main steps of the method according to the invention. In the example of FIG. 2 the display 10 of the data processing device is of that type which operates according to the touch screen principle. The touch screen 10 provides signals, which control the software application according to the invention.

Step 21 detects an obstacle 11, which covers at least a portion of the area of the display 10. Step 22 determines that portion of the display 10, which is hidden behind the obstacle 11. However, the displayed information 12b is not yet regrouped, but it remains in the partly hidden state of the previous step.

Step 23 performs a comparison in order to define the size of the obstacle 11 compared to a predetermined threshold value of the covered area. This threshold value of the covered area is advantageously defined for each display and/or for each user. If the covered area caused by the obstacle 11 is smaller than the defined threshold value, then it probably will not as such prevent the information in the display from being transmitted to the user of the device. Thus this comparison can prevent unnecessary regrouping of the display caused by small obstacles 11 in front of the display 10. If the covered area remains below the defined threshold value in step 23, the operation continues to step 28. In step 28 the display 10 returns to the initial state or remains in this initial state, in which the entire display area of the display 10 is used to display information.

If in step 23 the covered area caused by the obstacle 11 is found to exceed the set threshold value, then the operation continues to step 24. In step 24 the coverage time is measured for each covered point in the display 10, caused by the obstacle 11. This measurement result can be utilised both in step 25 and in step 26. The first comparison made in step 25 provides as a result information about whether the detected obstacle 11 moves in relation to the display 10, or whether it is stationary. This information is determined by examining whether the border points of the covered area change or not. If the obstacle 11 is still moving, the border points change, and a regrouping of the display 10 is not performed, but the operation returns to step 22. When the operation returns from step 25 to step 22 the grouping of the state/information in the display 10 does also not change, but it remains in that state where it was previously. This loop, steps 22 to 25, is repeated as long as the obstacle 11 moves in front of/above the display 10.

If step 25 determines that the obstacle 11 is stationary/has stopped, then the operation continues to step 26, where the display is regrouped. Advantageously the step 26 utilises the time measurement made in step 24. By utilising this time measurement each user can advantageously personally determine that period, after which a regrouping is made after the detected coverage caused by the obstacle 11. According to the invention it is advantageous in some applications to regroup the display 10 of the data processing device immediately when it has been found that the obstacle 11 has stopped, and when its size exceeds the preset threshold value. In some other application it may be advantageous to make the regrouping only when the situation has remained unchanged for a certain time. In both cases the information contained in the display 10 is regrouped at the end of step 26 so that despite the obstacle 11 in front of the display 10 the desired information contents 12c of the display can be viewed in that portion of the display 10, which is not covered by the obstacle 11.

When a certain period has elapsed after the regrouping made in step 26, the step 27 examines whether the obstacle 11 is still in front of the display 10. If the obstacle 11 is still found to be in front of the display 10, then the operation returns to step 22, and the process described above is repeated starting from that step. However, when the operation returns from step 27 to step 22 the display 10 is in the regrouped state at the start of the new process loop, and the state of the display is not changed until the step 26 is possibly reached again.

If the step 27 does not anymore detect any obstacle 11 in front of the display 10, then the display 10 is restored to its original display state 12a in step 28. Then the entire area of the display 10 can be utilised to display the information 12a. When the display state has been restored the operation has reached the state 29, where the process according to the invention is terminated.

Above we presented in connection with FIG. 2 an advantageous way to realise the basic idea according to the invention in a suitable display device. To a person skilled in the art it is obvious that the result according to the invention can be reached also by other procedures than by the steps of the exemplary process chain shown in FIG. 2. For instance, the regrouping can be made slower by a suitable hysteresis process.

The method according to the invention can be utilised in connection with any display device whose characteristics include the touch screen principle. However, the invention can be very advantageously applied in different portable data processing devices, as their display devices are generally made as thin as possible. Then it is probable that the display will be unintentionally covered from time to time. Examples of such devices are portable computers, palm computers, cellular network terminals and future electronic magazines and books. In such devices the steps according the presented method can be realised by a software application according to the invention, which is stored in the device.

Above we described some advantageous embodiment according to the invention. The invention is not restricted to the embodiments described above, but the invention can be applied for instance to display image information. Then it is possible to change the size and position of the displayed image so that it can be displayed in its entirety in the uncovered portion of the display. The inventive idea can be further applied in numerous ways within the scope of the claims.

The invention claimed is:

1. A method comprising: in displaying information in a touch display of a data processing device where a portion of the touch display area, and a portion of the information on the touch display, is covered by a tangible obstacle in front of the touch display,
    regrouping the information in the touch display into an uncovered portion of the display, so that at least a part of the information in the touch display left behind the tangible obstacle is regrouped into the uncovered portion of the touch display, and
    displaying the regrouped information.

2. The method according to claim 1, wherein a portion of the area of the touch display can in advance be defined as a region, in which there is made no regrouping of information.

3. The method according to claim 2, comprising:
    detecting an obstacle in front of the touch display,
    determining the size of the detected obstacle,
    deciding whether the detected obstacle exceeds the regrouping threshold value defined for the display,
    determining in each point covered by the obstacle the time, which has passed since the obstacle was detected,
    determining the movement of the obstacle with the aid of changes of the covered points at border regions of the coverage caused by the obstacle, and
    at least partially regrouping the information into a portion of the touch display, which is uncovered by the obstacle, if the obstacle remains stationary.

4. The method according to claim 3, wherein regrouping of the information is performed after a predetermined period has passed since the motion of the obstacle ended.

5. The method according to claim 1, wherein the information to be regrouped in the touch display is either text or an image or a combination of these.

6. The method according to claim 5, wherein the regrouping comprises changing the physical size of said information.

7. The method according to claim 1, wherein the method is utilized in a data processing device, which is one of the following: a portable computer, a palm computer, a cellular network terminal, a display unit of an electronic book or magazine.

8. A computer readable medium encoded with software comprising: a software application in a data processing device for displaying the information in the touch display of the data processing device where a portion of the touch display area, and a portion of the information on the touch display, is covered by a tangible obstacle in front of the touch display, wherein the information in the touch display is arranged to be regrouped by the software application so that at least a portion of the information contents in the touch display left behind the tangible obstacle is regrouped into an uncovered portion of the touch display.

9. The computer readable medium according to claim 8, wherein a portion of the touch display can be predefined as a region where regrouping of the information content is not performed.

10. The computer readable medium according to claim 9, wherein the software application is configured to
    detect an obstacle in front of the touch display,
    determine the size of the detected obstacle,
    decide whether the detected obstacle exceeds a regrouping threshold value defined for the display,
    determine in each point covered by the obstacle the time, which has passed since the obstacle was detected,
    determine the movement of the obstacle with the aid of changes of the covered points at border regions of the coverage caused by the obstacle, and
    at least to partially regroup the information into a portion of the touch display, which is uncovered by the obstacle, if the obstacle remains stationary.

11. The computer readable medium according to claim 10, wherein the regrouping of the information content in the touch display is arranged to be performed after a predetermined period has passed since the motion of the obstacle ended.

12. The computer readable medium according to claim 10, wherein the application is configured to regroup information, which comprises both text and images.

13. The computer readable medium according to claim 12, wherein during regrouping the application is configured to change the physical size of said information.

14. A computer readable medium encoded with a computer program, according to claim 8, on a storage or transfer means which program is loadable into the memory of a data processing device.

* * * * *